(12) United States Patent
Yamaguchi et al.

(10) Patent No.: US 7,851,066 B2
(45) Date of Patent: Dec. 14, 2010

(54) CURABLE FLUOROPOLYETHER COMPOSITION AND INTEGRAL MOLDED RESIN/RUBBER ARTICLES

(75) Inventors: Hiromasa Yamaguchi, Annaka (JP); Mikio Shiono, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 268 days.

(21) Appl. No.: 12/124,436

(22) Filed: May 21, 2008

(65) Prior Publication Data

US 2008/0293859 A1    Nov. 27, 2008

(30) Foreign Application Priority Data

May 21, 2007    (JP)    ............... 2007-134182

(51) Int. Cl.
*B32B 9/04*    (2006.01)

(52) U.S. Cl. ............... 428/447; 525/477; 525/478; 525/479; 528/31; 528/32; 528/35; 528/43; 428/480

(58) Field of Classification Search ............... None
See application file for complete search history.

(56) References Cited

U.S. PATENT DOCUMENTS

| 3,445,420 | A | 5/1969 | Kookootsedes et al. |
| 3,532,649 | A | 10/1970 | Smith et al. |
| 3,699,073 | A | 10/1972 | Wada et al. |
| 5,405,896 | A | 4/1995 | Fujiki et al. |
| 5,656,711 | A | 8/1997 | Fukuda et al. |
| 6,517,946 | B2 * | 2/2003 | Shiono et al. ............ 428/450 |
| 6,576,737 | B2 * | 6/2003 | Shiono et al. ............ 528/42 |
| 6,780,518 | B2 * | 8/2004 | Azechi et al. ............ 428/451 |
| 2005/0090602 | A1 * | 4/2005 | Koshikawa ............ 524/544 |
| 2007/0191554 | A1 | 8/2007 | Yamaguchi et al. |

FOREIGN PATENT DOCUMENTS

| EP | 1 413 588 A1 | 4/2004 |
| EP | 1 555 297 A1 | 7/2005 |
| EP | 1 818 367 A1 | 8/2007 |
| JP | 48-10947 | 4/1973 |
| JP | 3239717 | 10/2001 |
| JP | 3324166 | 7/2002 |
| JP | 2007-238928 | 9/2007 |

OTHER PUBLICATIONS

U.S. Appl. No. 12/418,046, filed Apr. 3, 2009, Yamaguchi, et al.

* cited by examiner

*Primary Examiner*—Marc S Zimmer
(74) *Attorney, Agent, or Firm*—Oblon, Spivak, McClelland, Maier & Neustadt, L.L.P.

(57) ABSTRACT

Curable fluoropolyether compositions comprising (a) a polyfluorodialkenyl compound, (b) a fluorinated organohydrogenpolysiloxane, (c) a platinum catalyst, (d) hydrophobic silica powder, (e) a tackifier in the form of a specific silicon compound, and (f) an organosiloxane having a SiH group, an epoxy and/or trialkoxysilyl group, and a perfluoroalkyl or perfluoropolyether group cure to thermoplastic resins to form a durable tight bond at a low temperature within a short time and are readily releasable from metal molds.

19 Claims, No Drawings

CURABLE FLUOROPOLYETHER COMPOSITION AND INTEGRAL MOLDED RESIN/RUBBER ARTICLES

CROSS-REFERENCE TO RELATED APPLICATION

This non-provisional application claims priority under 35 U.S.C. §119(a) on Patent Application No. 2007-134182 filed in Japan on May 21, 2007, the entire contents of which are hereby incorporated by reference.

FIELD OF THE INVENTION

This invention relates to curable fluoropolyether compositions which effectively cure to organic resins, especially thermoplastic resins under short-term curing conditions to form a durable tight bond and which themselves are releasable from rubber-shaping metal members, typically metal molds in a practically acceptable manner. It also relates to an integrally molded article comprising an organic resin and a cured rubber product of the curable fluoropolyether composition.

BACKGROUND ART

Curable fluoroelastomer compositions utilizing addition reaction of alkenyl groups and hydrosilyl groups are known in the art. Compositions of this type can be endowed with self adhesion by adding as a third component an organopolysiloxane having hydrosilyl groups and epoxy and/or trialkoxysilyl groups as disclosed in Japanese Patent No. 3239717. The composition can be cured by brief heating, and the cured product has satisfactory properties including solvent resistance, chemical resistance, heat resistance, low-temperature properties, low-moisture-permeability, and electrical properties. It is useful in an adhesion application in various industrial fields where such properties are required.

Although compositions of this type are satisfactorily adherent to metals including aluminum, stainless steel and iron, and general-purpose plastics including epoxy resins, phenolic resins and polyester resins, they are insufficiently adherent to engineering plastics such as polyphenylene sulfide (PPS) and nylons. They are not applicable where engineering plastics are used.

One method of combining an organic resin with fluoropolyether rubber is physical engagement of fluoropolyether rubber with organic resin into an integral assembly. This assembly can be disengaged by physical forces. Another method is by coating a self-adhesive fluoropolyether rubber composition to a molded resin and curing thereto. Since integral parts of resin and fluoropolyether rubber are often formed using a mold, there arises a serious problem that the fluoropolyether rubber itself adheres to the mold.

Japanese Patent No. 3324166 discloses a unique adhesive silicone rubber composition which is fully adherent to organic resins, especially thermoplastic resins, but not to metals, typically metal molds.

For the purpose of rationalizing the manufacture process, there is an increasing demand for integral molding of an organic resin and a fluoroelastomer under short-term curing conditions. It is thus desired to have a fluoropolyether rubber composition which is effectively adherent to organic resins and which is releasable from rubber-shaping metal members, typically metal molds in a practically acceptable manner.

DISCLOSURE OF THE INVENTION

We proposed an adhesive fluoropolyether composition comprising components (a) to (e), defined below, which tightly bonds to organic resins, especially thermoplastic resins, but not to metal members, typically metal molds (JP Appln. No. 2007-027590, US 2007/191554 or EP 1818367A1).

However, we found that this composition sometimes develops inconsistent adhesion to organic resins. It would be desirable to eliminate any inconsistency of adhesion by uniformly dispersing a tackifier throughout the composition. It was also required to further improve adhesion durability under heating conditions in polar solvents such as water and ethylene glycol.

An object of the present invention is to meet such requirements, that is, to provide a novel curable fluoropolyether composition which tightly bonds to organic resins, especially thermoplastic resins under short-term curing conditions, wherein the resulting bond remains fully durable under diverse conditions, and the resulting fluoropolyether rubber itself is releasable from rubber-shaping metal members, typically metal molds in a practically acceptable manner. Another object is to provide an integrally molded resin/rubber article using the curable fluoropolyether composition.

We have found that when a curable fluoropolyether composition comprising (a) a polyfluorodialkenyl compound, (b) a fluorinated organohydrogenpolysiloxane, (c) a platinum group compound, and (d) hydrophobic silica powder is further combined with (e) at least one silicon compound selected from formulae (I), (II), and (III) as a tackifier and (f) an organosiloxane having a SiH group, an epoxy and/or trialkoxysilyl group, and a perfluoroalkyl or perfluoropolyether group as an agent for improving dispersion of component (e), the resultant fluoropolyether rubber becomes fully adherent to organic resins, especially thermoplastic resins, and maintains durable adhesion, but is least adherent to metals.

In one aspect, the invention provides a curable fluoropolyether composition comprising components (a) to (f):

(a) 100 parts by weight of a polyfluorodialkenyl compound having at least two alkenyl groups per molecule, (b) a fluorinated organohydrogenpolysiloxane having at least two silicon-bonded hydrogen atoms (i.e., SiH groups) per molecule in a sufficient amount to provide 0.5 to 5.0 moles of SiH groups per mole of alkenyl groups available from component (a), (c) a platinum group metal catalyst in an amount to provide 0.1 to 500 ppm of platinum group metal based on the total weight of components (a) and (b), (d) 5 to 50 parts by weight of hydrophobic silica powder, (e) 0.01 to 15 parts by weight of a tackifier in the form of at least one silicon compound selected from the general formulae (I), (II), and (III):

A-(D-B)$_x$-D-A    (I)

C—(B-D)$_x$-B—C    (II)

A-E    (III)

wherein A and B each are a silane or siloxane linkage having at least one silicon-bonded hydrogen atom and optionally a silicon-bonded substituent group, the substituent group, if present, is an unsubstituted hydrocarbon group of 1 to 20 carbon atoms, A is a monovalent linkage, B is a divalent linkage, C, D and E each are a linkage containing at least one group selected from the following formulae (1) to (13) and optionally another group, the other group, if present, is an alkyl and/or alkylene group, C and E are monovalent linkages and D is a divalent linkage, with the proviso that E is a monovalent linkage in which the total number of atoms other than hydrogen and halogen atoms is at least 8, x is 0 or a positive number, (1) benzene ring with $R^1, R^2, R^3, R^4$ substituents (2) benzene ring with $R^1, R^2, R^3, R^4, R^5$ substituents (3) biphenyl with $R^1, R^2, R^3, R^4, R^5, R^6, R^7, R^8$ substituents (4) biphenyl with $R^1, R^2, R^3, R^4, R^5, R^6, R^7, R^8, R^9$ substituents (5) two benzene rings linked by X with $R^1$–$R^8$ substituents (6) two benzene rings linked by X with $R^1$–$R^9$ substituents (7) naphthalene with $R^1, R^2, R^3, R^4, R^5, R^6, R^7$ substituents (8) naphthalene with $R^1, R^2, R^3, R^4, R^5, R^6, R^7$ substituents (9) naphthalene with $R^1, R^2, R^3, R^4, R^5, R^6$ substituents

(10) naphthalene with $R^1, R^2, R^3, R^4, R^5, R^6$ substituents

(11) naphthalene with $R^1, R^2, R^3, R^4, R^5, R^6$ substituents

(12) naphthalene with $R^1, R^2, R^3, R^4, R^5, R^6$ substituents

-continued (13)

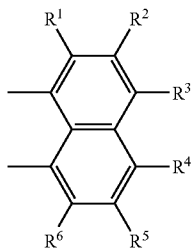

wherein $R^1$ to $R^9$ are each independently a monovalent group selected from the class consisting of hydrogen, halogen, hydroxyl, unsubstituted monovalent hydrocarbon groups of 1 to 20 carbon atoms, and monovalent organic groups having an alkoxy, epoxy and/or trialkoxysilyl group, X is a divalent group selected from the formulae:

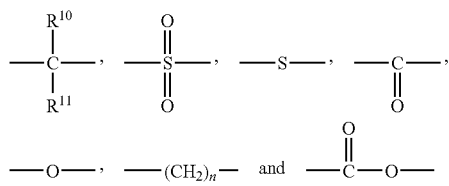

wherein $R^{10}$ and $R^{11}$ are each independently selected from the class consisting of hydrogen, halogen, unsubstituted monovalent hydrocarbon groups of 1 to 20 carbon atoms, and monovalent organic groups of 1 to 20 carbon atoms having a perfluoroalkyl or perfluoropolyether group, or $R^{10}$ and $R^{11}$, taken together, may form a carbocyclic or heterocyclic ring with the carbon atom to which they are attached, and n is an integer of at least 2, and (f) 0.01 to 10 parts by weight of an organosiloxane having per molecule at least one silicon-bonded hydrogen atom, at least one epoxy and/or trialkoxysilyl group attached to a silicon atom via carbon atoms or via carbon and oxygen atoms, and at least one perfluoroalkyl or perfluoropolyether group of 1 to 20 carbon atoms attached to a silicon atom via a divalent organic group, the organosiloxane serving to improve the dispersion of component (e).

In a preferred embodiment, component (a) is a polyfluorodialkenyl compound having alkenyl groups at both ends of the molecular chain, represented by the general formula (14):

$$CH_2=CH-(Z)_a-Rf-(Z')_a-CH=CH_2 \quad (14)$$

wherein Rf is a divalent group of the general formula (i) or (ii).

$$-C_tF_{2t}[OCF_2CF(CF_3)]_pOCF_2(CF_2)_rCF_2O[CF(CF_3)CF_2O]_qC_tF_{2t}- \quad (i)$$

Herein p and q each are an integer of 1 to 150, the sum of p+q is on the average 2 to 200, r is an integer of 0 to 6, and t is 2 or 3.

$$-C_tF_{2t}[OCF_2CF(CF_3)]_u(OCF_2)_vOC_tF_{2t}- \quad (ii)$$

Herein u is an integer of 1 to 200, v is an integer of 1 to 50, and t is as defined above.

Z is a divalent group of the formula: $-CH_2-$, $-CH_2O-$, $-CH_2OCH_2-$ or $-Y-NR-CO-$ wherein Y is a divalent group of the formula: $-CH_2-$ or the following formula:

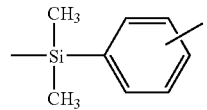

and R is hydrogen or a substituted or unsubstituted monovalent hydrocarbon group; Z' is a divalent group of the formula: $-CH_2-$, $-OCH_2-$, $-CH_2OCH_2-$ or $-CO-NR-Y'-$ wherein Y' is a divalent group of the formula: $-CH_2-$ or the following formula:

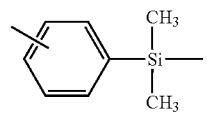

and R is as defined above; and "a" is independently 0 or 1.

In a preferred embodiment, the fluorinated organohydrogenpolysiloxane (b) has at least one perfluoroxyalkyl, perfluoroalkyl, perfluoroxyalkylene or perfluoroalkylene group per molecule.

In a preferred embodiment, the tackifier (e) exhibits a contact angle of up to 700 on an organic resin as an adherend.

In another aspect, the invention provides a molded rubber article obtained by integral molding of an organic resin and a cured rubber product of the curable fluoropolyether composition defined above.

An integral molded resin/rubber article comprising the molded rubber article defined above is suited for use in various applications, for example, in automobiles as diaphragms such as fuel regulator diaphragms, pulsation damper diaphragms, oil pressure switch diaphragms, and EGR diaphragms, valves such as canister valves and power control valves, O-rings such as quick connector O-rings and injector O-rings, seals such as oil seals and cylinder head gaskets, or the like; in chemical plants as pump diaphragms, valves, O-rings, packing, oil seals, gaskets or the like; in ink jet printers and semiconductor manufacturing lines as diaphragms, valves, O-rings, packing, gaskets or the like; in analytical and scientific instruments and medical equipment as pump diaphragms, O-rings, packing, valves, joints or the like; as tent coating materials, molded parts, extruded parts, coats, copier roll materials, electrical moisture-proof coatings, laminate rubber fabrics, fuel cell gaskets, seals or the like; in aircraft as O-rings, face seals, packing, gaskets, diaphragms, valves or the like in fluid piping for engine oil, jet fuel, hydraulic oil, Skydrol® or the like.

BENEFITS OF THE INVENTION

The curable fluoropolyether composition of the invention cures into a cured product having satisfactory properties including solvent resistance, chemical resistance, heat resistance, low-temperature properties, and low-moisture-permeability. It is fully adherent to organic resins by heating at a relatively low temperature for a relatively short time and maintains the adhesion in a durable manner, but is little adherent to metals, so that it is useful in integral molding of fluoropolyether rubber and organic resin in a metal mold to form an integral composite part. It is useful as bonding and sealing members for electric and electronic parts in magnetic hard disk drives, optical disk drives, microwave ovens and other electric appliances, building sealing materials, automobile rubber materials, and the like. In particular, it forms a fluoroelastomer having excellent adhesion to polycarbonate (PC), polyethylene terephthalate (PET), polyethylene naphthalate (PEN) and similar plastics, so that it is useful in a bonding application to articles (e.g., housings) based on such plastics.

DESCRIPTION OF THE PREFERRED EMBODIMENTS

One embodiment of the invention is a fluoropolyether composition of addition reaction cure type comprising components (a) to (f).

(a) Polyfluorodialkenyl Compound

A main component in the fluoropolyether rubber composition of addition reaction cure type according to the invention is a polyfluorodialkenyl compound having at least two alkenyl groups per molecule. The polyfluorodialkenyl compound has alkenyl groups at both ends of its molecular chain and is preferably of the following general formula (14).

$$CH_2=CH-(Z)_a-Rf-(Z')_a-CH=CH_2 \quad (14)$$

Herein Z is a divalent group of the formula: $-CH_2-$, $-CH_2O-$, $-CH_2OCH_2-$ or $-Y-NR-CO-$ wherein Y is a divalent group of the formula: $-CH_2-$ or the following formula:

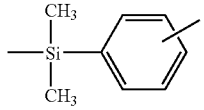

and R is hydrogen or a substituted or unsubstituted monovalent hydrocarbon group. Z' is a divalent group of the formula:

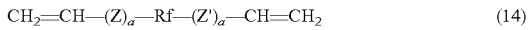

$-CH_2-$, $-OCH_2-$, $-CH_2OCH_2-$ or $-CO-NR-Y'-$ wherein Y' is a divalent group of the formula: $-CH_2-$ or the following formula:

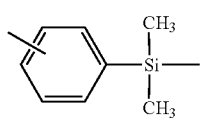

and R is as defined above. The subscript "a" is each independently 0 or 1.

R associated with Z or Z' stands for hydrogen atoms or substituted or unsubstituted monovalent hydrocarbon groups, preferably of 1 to 12 carbon atoms, more preferably of 1 to 10 carbon atoms, for example, alkyl groups such as methyl, ethyl, propyl, butyl, hexyl, cyclohexyl and octyl, aryl groups such as phenyl and tolyl, aralkyl groups such as benzyl and phenylethyl, and substituted forms of the foregoing groups in which some or all of the hydrogen atoms are replaced by halogen atoms.

Rf is a divalent group of the general formula (i) or (ii).

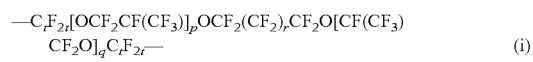

Herein p and q each are an integer of 1 to 150, the sum of p+q is on the average 2 to 200, r is an integer of 0 to 6, and t is 2 or 3.

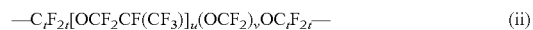

Herein u is an integer of 1 to 200, v is an integer of 1 to 50, and t is as defined above.

Included in the groups of formula (i) are groups of the formula (i'):

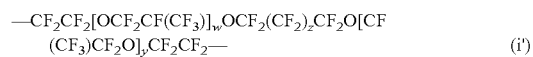

wherein w and y each are an integer of at least 1, the sum of w+y is on the average 2 to 200, and z is an integer of 0 to 6.

Specific examples of Rf include groups of the following three formulae, of which divalent groups of the first formula are preferred.

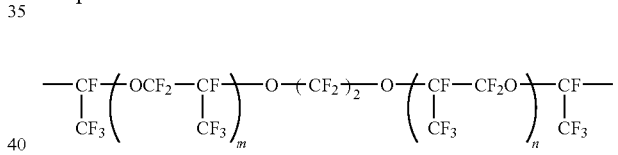

Herein, m and n each are an integer of at least 1, and an average of m+n is from 2 to 200.

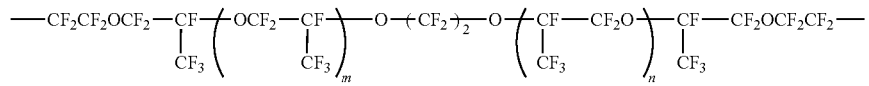

Herein, m and n each are an integer of at least 1, and an average of m+n is from 2 to 200.

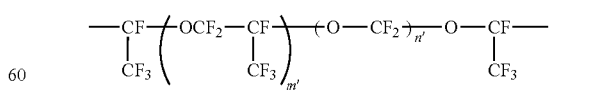

Herein, m' is an integer of 1 to 200, and n' is an integer of 1 to 50.

Illustrative examples of the polyfluorodialkenyl compound having formula (14) are given below.

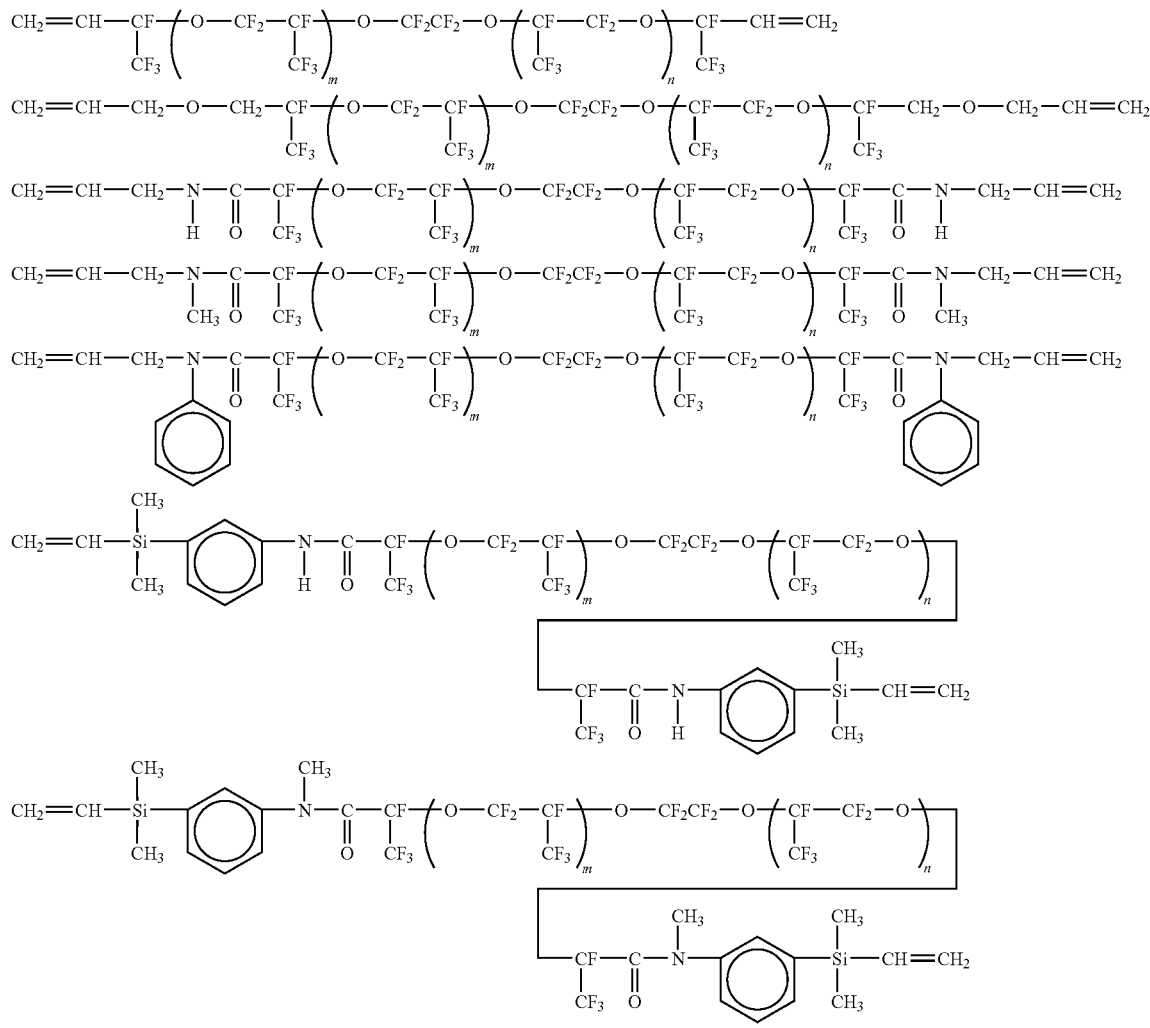

Herein, m and n each are an integer of at least 1, and an average of m+n is from 2 to 200.

(b) Fluorinated Organohydrogenpolysiloxane

To component (a), a fluorinated organohydrogenpolysiloxane (b) is added as a crosslinker or chain extender. It is a fluorine-modified organosilicon compound having at least two silicon-bonded hydrogen atoms (i.e., SiH groups) per molecule. From the standpoints of compatibility with or dispersibility in component (a) and uniformity after curing, the fluorinated organohydrogenpolysiloxane should preferably contain at least one perfluoroxyalkyl, perfluoroalkyl, perfluoroxyalkylene or perfluoroalkylene group per molecule as well as at least two, more preferably at least three hydrosilyl groups.

The perfluoroxyalkyl, perfluoroalkyl, perfluoroxyalkylene, and perfluoroalkylene groups include those of the following general formulae.

Perfluoroalkyl Groups:

$C_gF_{2g+1}-$

Herein g is an integer of 1 to 20, preferably 2 to 10.

Perfluoroalkylene Groups:

$-C_gF_{2g}-$

Herein g is an integer of 1 to 20, preferably 2 to 10.

Perfluoroxyalkyl Groups:

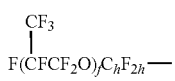

Herein f is an integer of 2 to 200, preferably 2 to 100, and h is an integer of 1 to 3.

Perfluoroxyalkylene Groups:

Herein i and j each are an integer of at least 1, and an average of i+j is 2 to 200, and preferably 2 to 100.

$-(CF_2CF_2O)_k(CF_2O)_pCF_2-$

Herein k and p each are an integer of at least 1, and an average of k+p is 2 to 200, and preferably 2 to 100.

Divalent linkages for linking the above perfluoroalkyl, perfluoroxyalkyl, perfluoroalkylene or perfluoroxyalkylene groups with silicon atoms include alkylene and arylene groups and combinations thereof, which may be separated by an ether, amide, carbonyl or similar bond. Specific examples include linkages having 2 to 12 carbon atoms, such as —CH$_2$CH$_2$—, —CH$_2$CH$_2$CH$_2$—, —CH$_2$CH$_2$CH$_2$OCH$_2$—, —CH$_2$CH$_2$CH$_2$—NH—CO—, —CH$_2$CH$_2$CH$_2$—N(Ph)-CO—, —CH$_2$CH$_2$CH$_2$—N(CH$_3$)—CO—, —CH$_2$CH$_2$CH$_2$—O—CO—, and -Ph'-N(CH$_3$)—CO— wherein Ph is phenyl and Ph' is phenylene.

In addition to the monovalent or divalent fluorinated substituent group, i.e., organic group having a perfluoroxyalkyl, perfluoroalkyl, perfluoroxyalkylene or perfluoroalkylene group, the fluorinated organohydrogenpolysiloxane (b) may contain a monovalent substituent group bonded to a silicon atom. Suitable substituent groups are substituted or unsubstituted hydrocarbon groups of 1 to 20 carbon atoms including alkyl groups such as methyl, ethyl, propyl, butyl, hexyl, cyclohexyl, octyl, and decyl, aryl groups such as phenyl, tolyl and naphthyl, aralkyl groups such as benzyl and phenylethyl, and substituted forms of the foregoing in which at least some hydrogen atoms are substituted by chlorine atoms, cyano groups or the like, such as chloromethyl, chloropropyl, and cyanoethyl.

The fluorinated organohydrogenpolysiloxane (b) may be cyclic, chain-like, three-dimensional network or combinations thereof. Although the number of silicon atoms in the fluorinated organohydrogenpolysiloxane is not particularly limited, it is generally from 2 to about 60, preferably from 3 to about 30.

Suitable organohydrogenpolysiloxanes (b) having a fluorinated group include the compounds shown below. These compounds may be used alone or in admixture of two or more. In the formulae, Ph is phenyl.

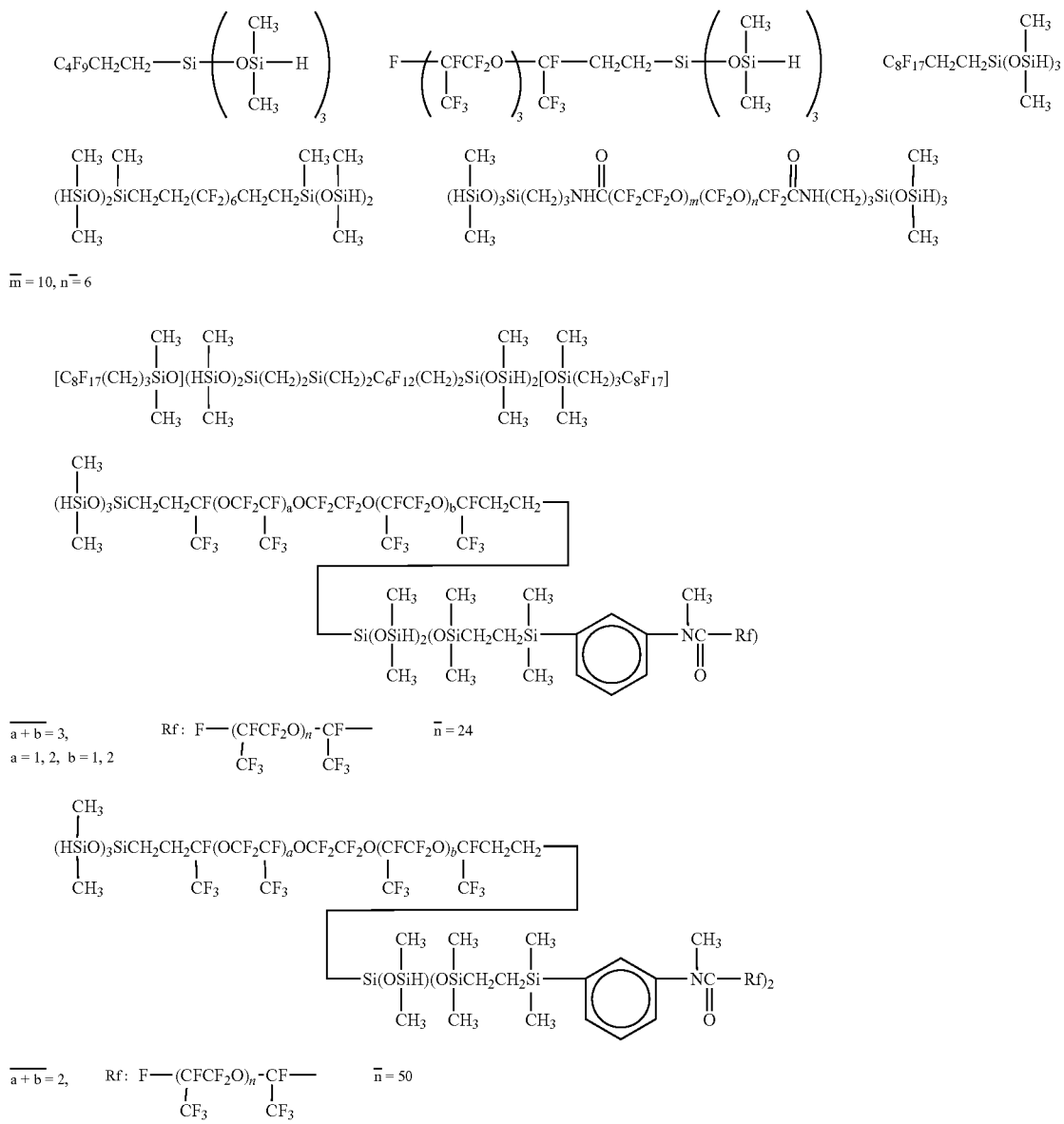

-continued
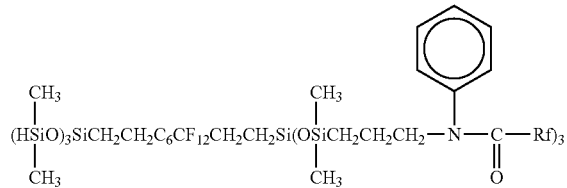
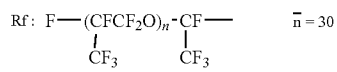
$\bar{n} = 30$
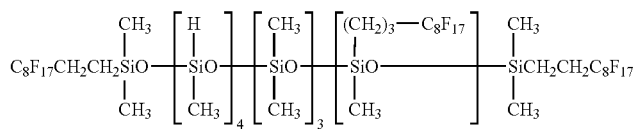
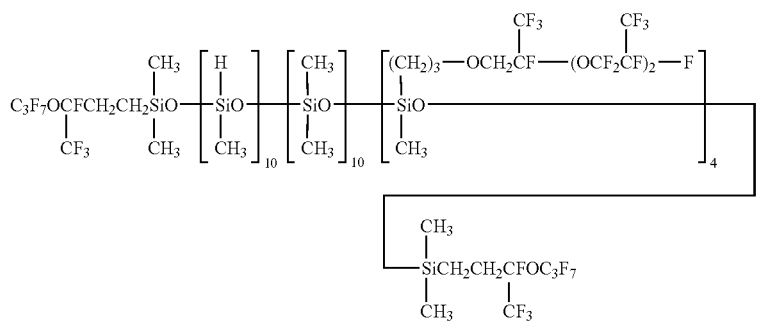
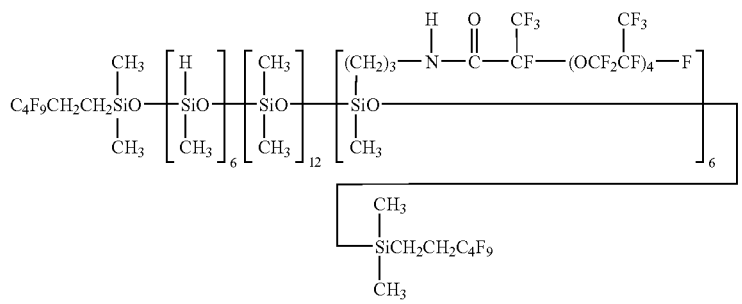
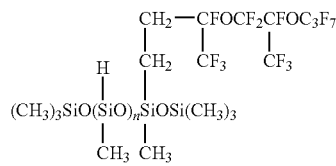
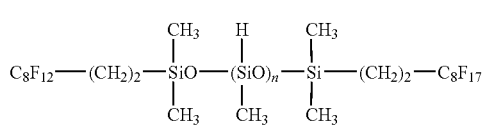
$\bar{n} = 3 \sim 50$
$\bar{n} = 3 \sim 50$
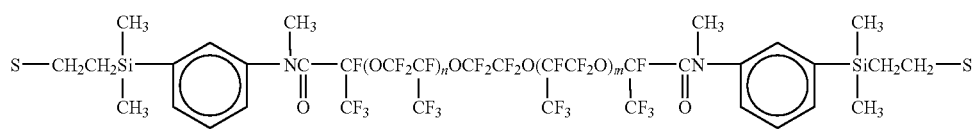

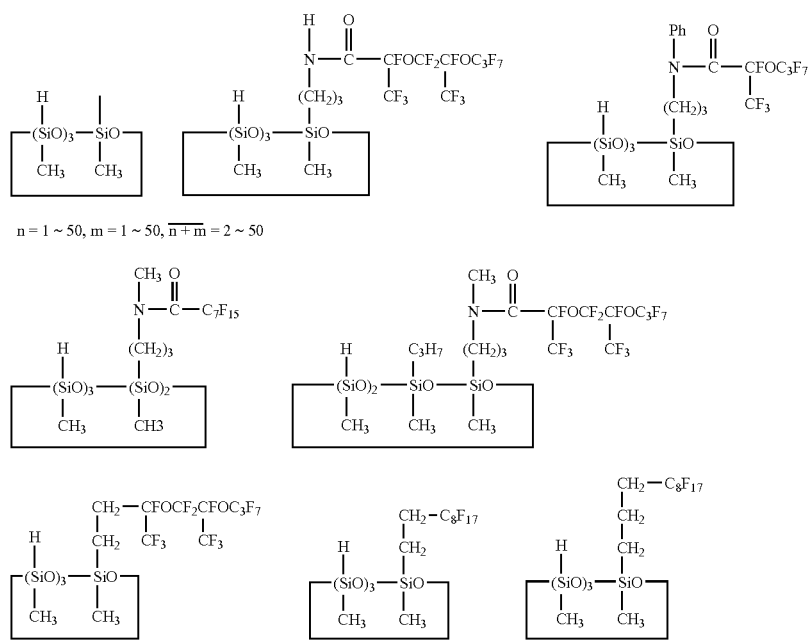

n = 1 ~ 50, m = 1 ~ 50, $\overline{n+m}$ = 2 ~ 50

Component (b) is compounded in an effective amount to cure component (a). Specifically, component (b) is used in a sufficient amount to provide 0.5 to 5.0 moles, and preferably 1.0 to 2.0 moles of SiH groups (available from component (b)) per mole of the entire alkenyl groups available from component (a). Outside the range, too less amounts may lead to an insufficient degree of crosslinking. With excessive amounts, chain extension may become predominant, resulting in such disadvantages as undercure, foaming or degraded properties of heat resistance and compression set.

For producing a uniform cured product, it is desired to use the crosslinker (b) which is compatible with component (a).

(c) Platinum Group Compound

Component (c) is a platinum group metal catalyst for promoting the addition reaction between alkenyl groups in component (a) and hydrosilyl groups in component (b). Of the platinum group metal catalysts, platinum compounds are often used because they are readily available. Exemplary platinum compounds include chloroplatinic acid; complexes of chloroplatinic acid with olefins (e.g., ethylene), alcohols and vinylsiloxanes; and metallic platinum supported on silica, alumina or carbon. Known platinum group metal catalysts other than the platinum compounds include rhodium, ruthenium, iridium, and palladium compounds, for example, $RhCl(PPh_3)_3$, $RhCl(CO)(PPh_3)_2$, $Ru_3(CO)_{12}$, $IrCl(CO)(PPh_3)_2$, and $Pd(PPh_3)_4$ wherein Ph denotes phenyl.

The platinum group metal catalyst may be used in a catalytic amount. It is preferably added in an amount to give 0.1 to 500 parts by weight of platinum group metal per million parts by weight of components (a) and (b) combined.

(d) Silica Powder

Component (d) is hydrophobic silica powder which functions to impart appropriate physical strength to the cured product of the composition. The silica powder should preferably have a specific surface area of at least 50 m$^2$/g, and more preferably 50 to 400 m$^2$/g, as measured by the standard BET method, as is often required as a filler for silicone rubber.

The hydrophobic silica powder is obtained through hydrophobic treatment of fumed silica or colloidal silica with silicon compounds or the like. The treatment of silica with silicon compounds for hydrophobizing may be performed by well-known methods, and an optimum method may be selected for a particular type of silicon compound used.

Suitable silicon compounds include organochlorosilanes such as trimethylchlorosilane, dimethylvinylchlorosilane, and dimethyldichlorosilane; organosilazanes such as hexamethyldisilazane, 1,3-divinyl-1,1,3,3-tetramethyldisilazane, and hexamethylcyclotrisilazane; and organohydroxysilanes such as trimethylhydroxysilane and dimethylhydroxysilane, which may be used alone or in admixture.

As to component (d), it is also possible to add a fluorinated organosilane or fluorinated organosiloxane as a surface treating agent to silica powder. The surface treating agent may be added when a mixture of polyfluorodialkenyl compound (a) and silica powder (d) is heat kneaded in a milling means such as a kneader. Heat treatment is performed while a small amount of water is added if necessary, whereby surface silanol on silica particles is treated. The heat treatment is performed at a temperature in the range of 100 to 200° C. This improves the miscibility of silica powder with other components for thereby restraining the composition from the "crepe hardening" phenomenon during shelf storage and ameliorating the flow of the composition.

Suitable fluorinated organosilanes and organosiloxanes may be organosilanes and organosiloxanes having at least one monovalent perfluoroxyalkyl group, monovalent perfluoroalkyl group, divalent perfluorooxyalkylene group or divalent perfluoroalkylene group, and at least one silicon-bonded hydroxy and/or alkoxy group, and preferably alkoxy group of 1 to 6 carbon atoms, more preferably 1 to 4 carbon atoms, in the molecule. Their molecular structure is not particularly limited.

Component (d) is compounded in an amount of 5 to 50 parts by weight, preferably 10 to 30 parts by weight per 100 parts by weight of component (a). If the amount of component (d) is less than 5 pbw, cured physical properties may be poor and adhesion be inconsistent. If the amount of component (d) exceeds 50 pbw, the resulting composition may become less flowing and inefficient to work and mold, and cured physical properties may be poor.

(e) Tackifier

Component (e) is a tackifier which is at least one silicon compound selected from the general formulae (I), (II), and (III):

A-(D-B)$_x$-D-A                         (I)

C—(B-D)$_x$-B—C                       (II)

A-E                                              (III)

wherein A and B each are a silane or siloxane linkage having at least one silicon-bonded hydrogen atom and optionally a silicon-bonded substituent group, the substituent group, if present, is an unsubstituted hydrocarbon group of 1 to 20 carbon atoms, A is a monovalent linkage, B is a divalent linkage; C, D and E each are a linkage containing at least one group selected from the formulae (1) to (13) and optionally another group, the other group, if present, is an alkyl and/or alkylene group, C and E are monovalent linkages and D is a divalent linkage, with the proviso that E is a monovalent linkage in which the total number of atoms other than hydrogen and halogen atoms is at least 8; and x is 0 or a positive number.

Component (e) is an essential component for the invention. The minimum requirement of this compound (e) is that it have at least one hydrogen atom directly bonded to a silicon atom (i.e., SiH group) in the molecule and it improve the affinity of the composition to an organic resin as adherend. As used herein, the term "adherend" refers to a body to which the fluoropolyether composition is to be bonded, specifically of organic resin, more specifically thermoplastic resin. From the standpoint of bonding fluoropolyether rubber to an organic resin adherend, it is preferred that the compound (e) have at least two silicon-bonded hydrogen atoms. However, adhesion to organic resin is not achievable only with this feature because there exists a so-called compatibility between the organic resin adherend and component (e). That is, from the standpoint of reactivity with organic resin, the contact angle becomes a significant factor. Then component (e) varies in accordance with the type of organic resin as the adherend. While most organic resins as the adherend are generally composed of carbon, oxygen, nitrogen and sulfur atoms, component (e) should have a linkage C, D or E in addition to the silane or siloxane linkage A or B in order to enhance the affinity to organic resins.

Moreover, component (e) should preferably be molten under actual bonding conditions. A compound in a molten state having a contact angle equal to or less than 70° on a resin adherend is preferred for achieving the objects of the invention. Measurement of contact angle may generally be carried out at normal temperature (25° C.) although the temperature at which fluoropolyether rubber is cured is regarded optimum for measurement. However, if component (e) is solid or wax at normal temperature, the contact angle in the molten state must be measured.

For making more definite the concept of component (e) in the invention, the concept contemplated by the inventor is described below although the invention is not limited thereby. Specifically, the inventor has found that a hydrosilyl group (≡SiH) is effective as a factor capable of forming a bond to thermoplastic resins, that is, a factor capable of generating a great cohesive force between cured fluoropolyether rubber and thermoplastic resin. Although it is not sure whether hydrosilylation reaction with the resin occurs or silanol (≡SiOH) forms as a result of hydrolysis and acts as a secondary cohesive force for adhesion, it is sure that in fact, the ≡SiH group greatly contributes to adhesion. Another significant factor accounting for adhesion is interaction with thermoplastic resin. It is contemplated that a certain portion (specifically linkage C, D or E) of component (e) contains a molecular skeleton moiety having a high affinity to the resin adherend, which brings the overall component (e) closer to a distance at which cohesive force with the thermoplastic resin adherend is generated.

For this reason, component (e) as used herein is not generally encompassed within fluorinated organohydrogenpolysiloxanes which are generally used as a curing agent in addition reaction curing fluoropolyether rubber compositions. Specifically, fluorinated organohydrogenpolysiloxanes used as the curing agent are compounds having a very low surface tension as is well known in the art. They thus have a contact angle of less than 70° with the resin surface, but fail to develop adhesion to organic resins as intended herein. This suggests a need for a group capable of imparting affinity to organic resins, in addition to the siloxane bond. That is, it is believed that in the structure of component (e), the hydrosilyl group serves as a cohesive force-generating functional group and the linkage C, D or E other than the siloxane bond plays the role of bringing component (e) closer to the cohesive force-generating region relative to the resin adherend. To this end, the relevant moiety should preferably have a structure similar to that of the adherend resin. The contact angle is one index representative of similarity.

Therefore, component (e) should be a compound of formula (I), (II) or (III), that is, a compound containing a linkage A or B having at least one, preferably at least two, SiH group and a linkage C, D or E. The compound as component (e) is free of a perfluoroalkyl, perfluoroxyalkyl, perfluoroalkylene or perfluoroxyalkylene group.

As described above, A and B each are a silane or siloxane linkage having at least one silicon-bonded hydrogen atom (i.e., SiH group) and optionally a silicon-bonded substituent group, wherein the substituent group, if present, is an unsubstituted hydrocarbon group of 1 to 20 carbon atoms such as alkyl, A is a monovalent linkage, B is a divalent linkage Each of C, D and E is a linkage containing at least one group selected from the following formulae (1) to (13) and optionally another group, wherein the other group, if present, is an alkyl and/or alkylene group, C and E are monovalent linkages and D is a divalent linkage. Specifically, E is a monovalent linkage in which the total number of atoms other than hydrogen and halogen atoms is at least 8, preferably 8 to 20. The subscript x is 0 or a positive number, and preferably 0 or an integer of 1 to 10.

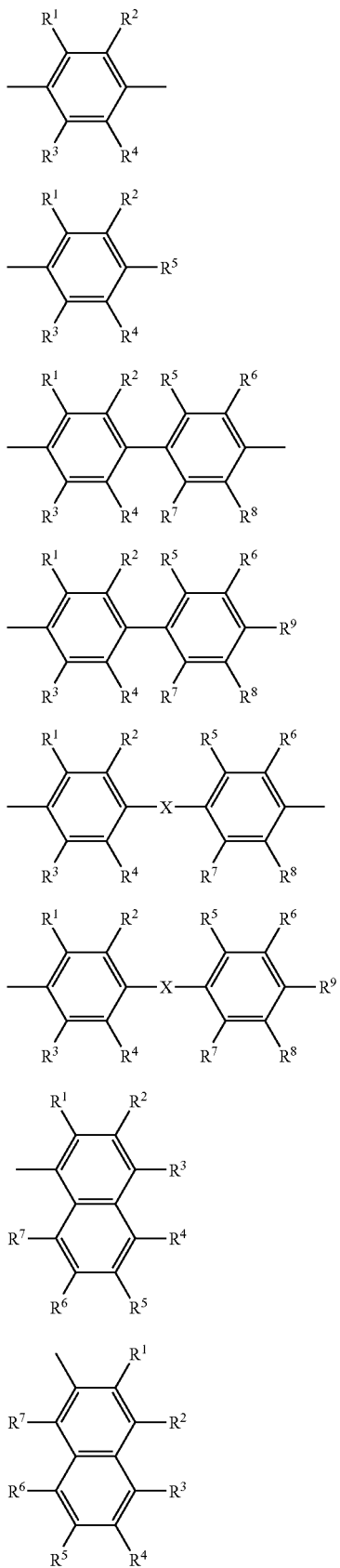
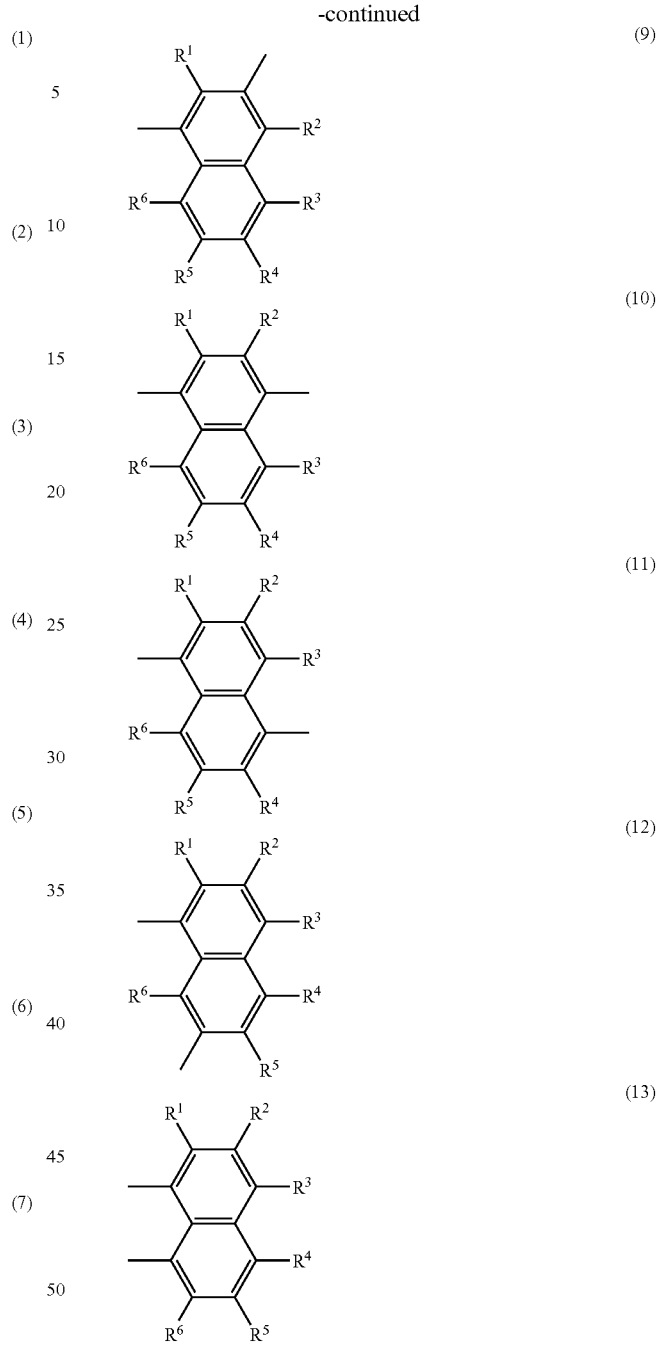
Herein $R^1$ to $R^9$ are each independently a monovalent group selected from among hydrogen, halogen, hydroxyl, unsubstituted monovalent hydrocarbon groups of 1 to 20 carbon atoms (e.g., alkyl), and monovalent organic groups having an alkoxy, epoxy and/or trialkoxysilyl group.
X is a divalent group selected from the formulae:
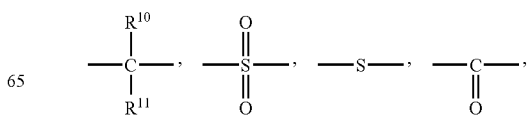

-continued

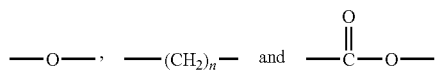

wherein $R^{10}$ and $R^{11}$ are each independently selected from among hydrogen, halogen, and unsubstituted monovalent hydrocarbon groups of 1 to 20 carbon atoms (e.g., alkyl), or $R^{10}$ and $R^{11}$, taken together, may form a carbocyclic or heterocyclic ring with the carbon atom to which they are attached, and n is an integer of at least 2 and preferably 2 to 6.

Exemplary carbocyclic and heterocyclic rings are shown below.

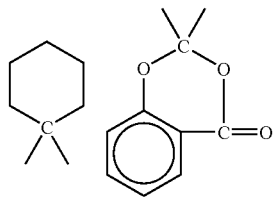

Illustrative examples of component (e) are shown below.

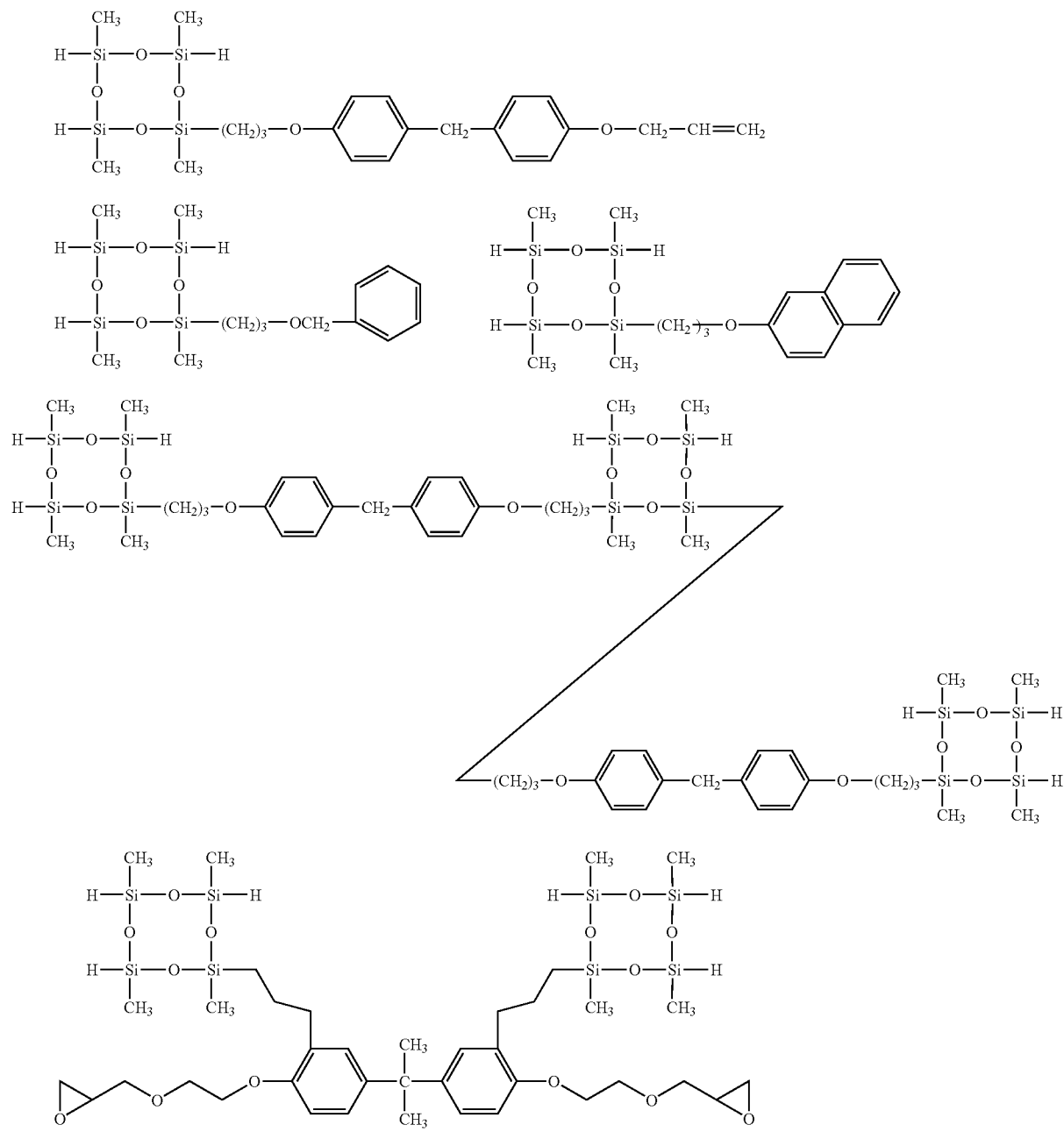

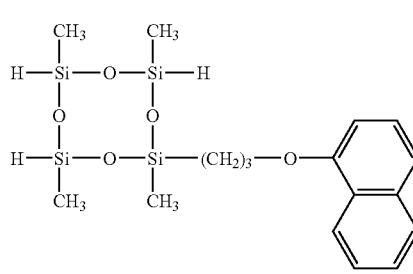
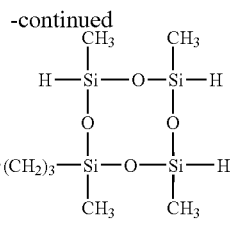
The following formulae are also exemplary of component (e).
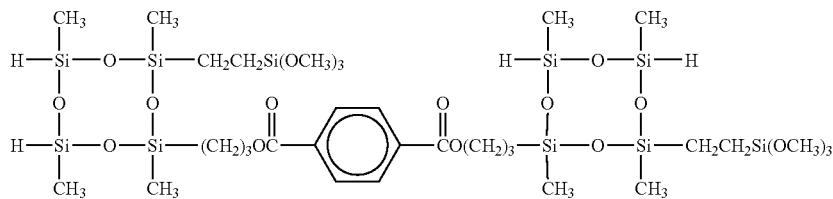
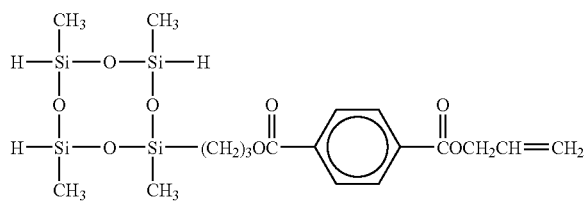
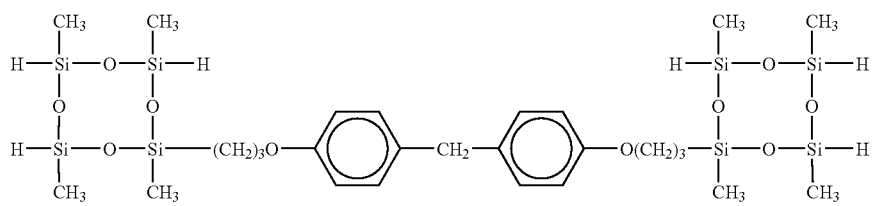
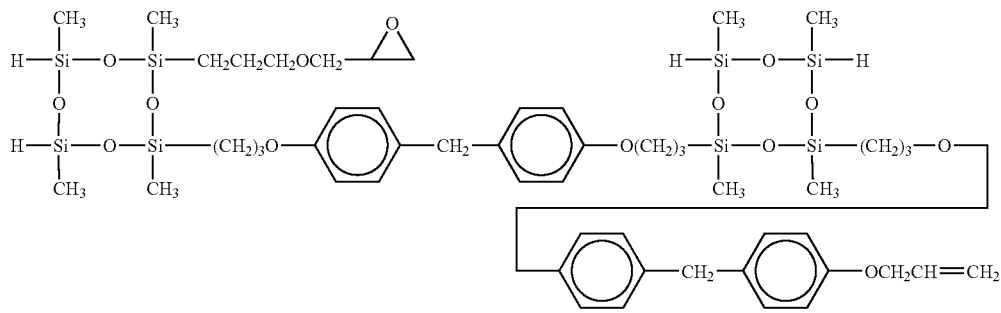
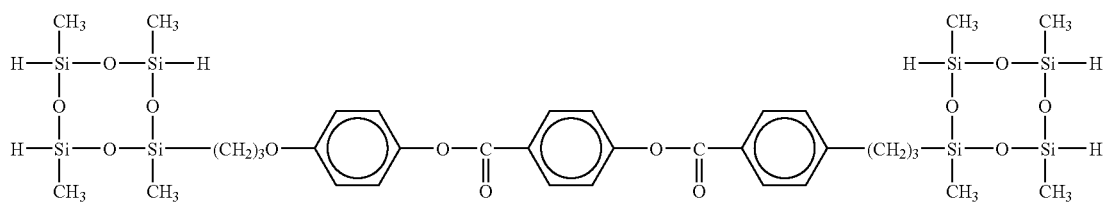

-continued
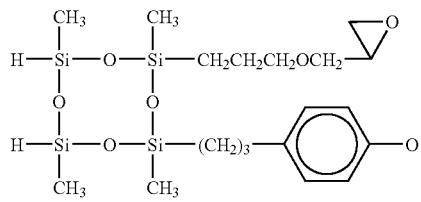
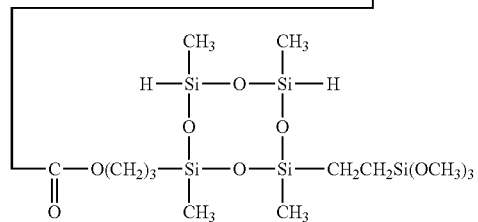
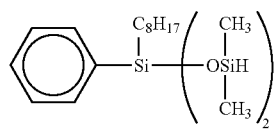
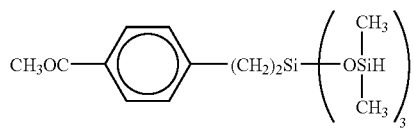
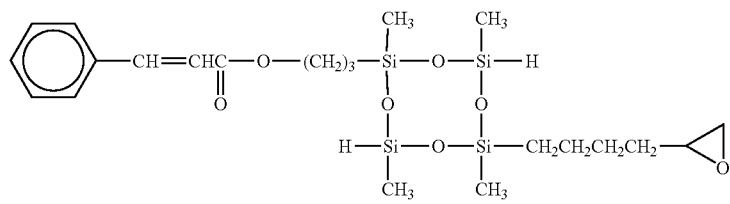
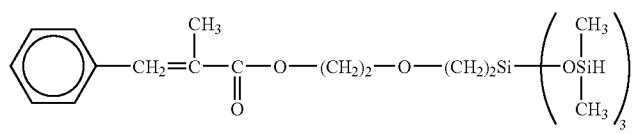
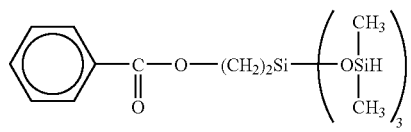
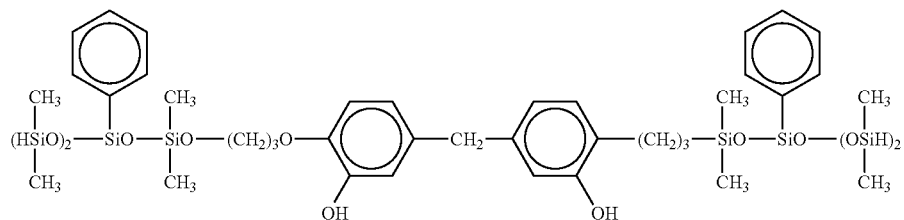
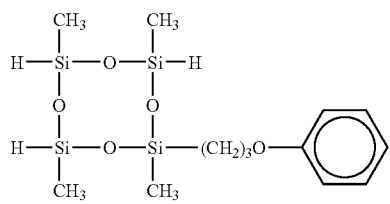
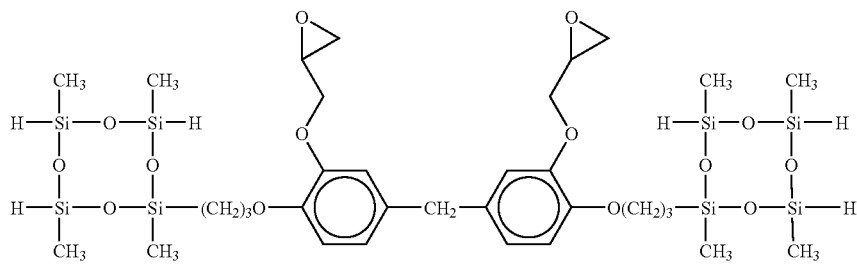

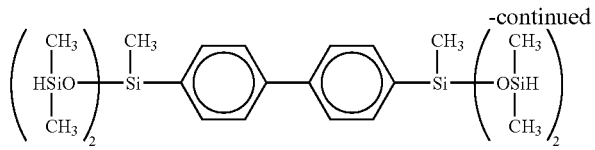

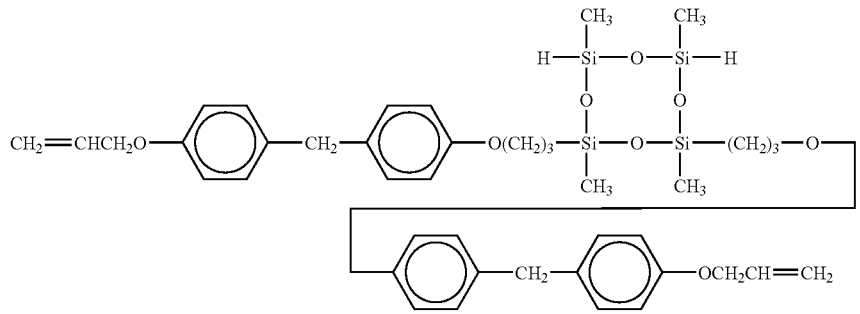

Component (e) may be compounded in any desired amount although an appropriate amount is 0.01 to 30 parts by weight, and more preferably 0.1 to 5 parts by weight per 100 parts by weight of polyfluorodialkenyl compound (a). Less than 0.01 pbw of component (e) may be insufficient to provide adhesion to the resin adherend. More than 30 pbw of component (e) can adversely affect the physical properties of fluoropolyether rubber and rather provide some adhesion to metals.

(f) Dispersion Improver

Component (f) is an organosiloxane having per molecule at least one silicon-bonded hydrogen atom, at least one epoxy and/or trialkoxysilyl group attached to a silicon atom via carbon atoms or via carbon and oxygen atoms, and at least one perfluoroalkyl or perfluoropolyether group of 1 to 20 carbon atoms attached to a silicon atom via a divalent organic group.

Suitable perfluoroalkyl groups are those of the formula:

wherein g is an integer of 1 to 20, and preferably 2 to 10. Suitable perfluoropolyether groups are those of the formula:

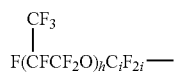

wherein h is an integer of 1 to 6, i is an integer of 0 to 3, and 3h+i is 3 to 20. Suitable organic groups containing these groups are these groups as such and these groups having an alkylene group of 1 to 3 carbon atoms linked thereto.

Component (f) is another essential component characterizing the invention. It is added in order to improve the dispersion of component (e). In general, the dispersion of component (e) depends on its compatibility with components (a) to (d), especially component (a). If component (e) is highly compatible with component (a), then its dispersion would be improved, but a less portion of component (e) could approach the interface with the resin (cohesive force developing region) upon curing, failing to fully exert adherence. Inversely, if component (e) is less compatible with component (a), then component (e) would readily collect locally at the resin interface upon curing, and even component (e) itself might agglomerate together at the resin interface, introducing variations in adherence.

This problem might be solved by modifying the silicon compound as component (e) with a perfluoroalkyl or perfluoropolyether group. This method is difficult to develop high adherence in a consistent manner because too high a compatibility may be endowed or substantial variations may be introduced among lots.

The organosiloxane should preferably have 3 to 50 silicon atoms, and more preferably 4 to 10 silicon atoms. It may have another group bonded to a silicon atom other than the above-mentioned groups, and examples of the other group include monovalent hydrocarbon groups of 1 to 10 carbon atoms, preferably 1 to 6 carbon atoms, and specifically alkyl groups.

The divalent organic group (or linking group) for linking the perfluoroalkyl or perfluoropolyether group to a silicon atom is exemplified by an alkylene group, an arylene group or a combination thereof, which may be separated by an ether, amide, carbonyl or similar bond. Exemplary are organic groups of 2 to 12 carbon atoms, for example, —CH₂CH₂—, —CH₂CH₂CH₂—, —CH₂CH₂CH₂OCH₂—, —CH₂CH₂CH₂—NH—CO—, —CH₂CH₂CH₂—N(Ph)-CO—, —CH₂CH₂CH₂—N(CH₃)—CO—, —CH₂CH₂CH₂—O—CO—, and -Ph'-N(CH₃)—CO— wherein Ph is phenyl and Ph' is phenylene.

The carbon atoms or the carbon and oxygen atoms for linking the epoxy and/or trialkoxysilyl group to a silicon atom are exemplified by alkylene groups of 2 to 12 carbon atoms and alkylene groups having an ether bond (—O—).

According to the invention, an organosiloxane modified with a perfluoroalkyl or perfluoropolyether group is added in a small amount as an agent for improving the dispersion of component (e), thereby helping component (e) be uniformly dispersed at the interface with the resin. As a result, a high bond strength is achieved in a consistent manner, and that bond strength remains durable even under heating conditions in polar solvents such as water and ethylene glycol.

Exemplary of component (f) are those compounds shown below.

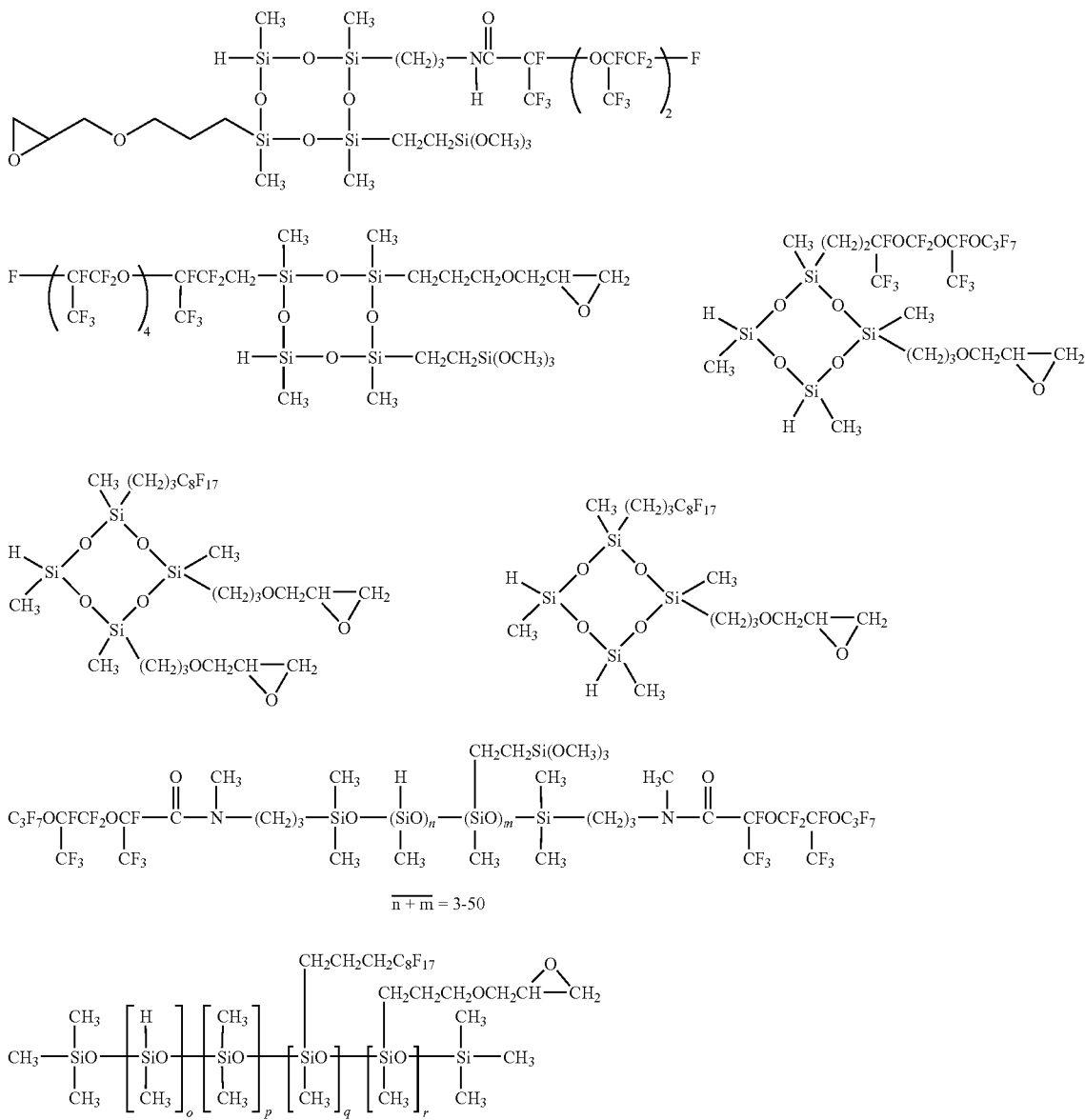

Herein o, q and r are positive integers, and p is an integer inclusive of 0.

Component (f) may be compounded in any desired amount although an appropriate amount is 0.01 to 15 parts by weight, and more preferably 0.1 to 3 parts by weight per 100 parts by weight of polyfluorodialkenyl compound (a). Less than 0.01 pbw of component (f) fails to achieve the dispersion improving effect whereas more than 15 pbw of component (f) can adversely affect the physical properties of fluoropolyether rubber and rather provide some adhesion to metals. Also preferably components (e) and (f) are combined in a weight ratio between 1:0.01 and 1:1, and more preferably between 1:0.1 and 1:0.3. Less than 0.01 part of component (f) per part of component (e) may fail to achieve the dispersion improving effect. If the amount of component (f) is more than 1 part per part of component (e), dispersibility is excessively enhanced so that a less portion of component (e) might approach the resin interface (cohesive force developing region) upon curing, with the inconvenient result of exerting undue adherence or rather providing some adhesion to metals.

Other Components

To the curable fluoropolyether composition of the invention, various other additives may be added if necessary for enhancing the viable utility of the composition.

Suitable additives include polysiloxanes comprising $CH_2$=$CH(R)SiO$ units wherein R is hydrogen or a substituted or unsubstituted monovalent hydrocarbon group (see JP-B 48-10947) and acetylene compounds (see U.S. Pat. No. 3,445,420 and JP-B 4-3774) for controlling the cure rate of curable compositions, as well as ionic heavy metal compounds (see U.S. Pat. No. 3,532,649).

Also suitable are regulators for controlling the hydrosilylating reaction catalyst. Exemplary regulators include acetylene alcohols such as 1-ethynyl-1-hydroxycyclohexane, 3-methyl-1-butyn-3-ol, 3,5-dimethyl-1-hexyn-3-ol, 3-methyl-1-penten-3-ol, and phenyl butynol, and 3-methyl-3-penten-1-yne, 3,5-dimethyl-3-hexen-1-yne, polymethylvinylsiloxane cyclic compounds, organophosphorus compounds, and the like. The addition of the regulator keeps appropriate curing reactivity and shelf stability.

To the curable fluoropolyether composition of the invention, fillers may be added for the purpose of reducing thermal shrinkage upon curing, reducing the coefficient of thermal expansion of an elastomer as cured, improving the thermal stability, weather resistance, chemical resistance, flame retardance or mechanical strength thereof, or reducing the gas permeability thereof. Suitable inorganic fillers include reinforcing or semi-reinforcing fillers (exclusive of silica) such as quartz flour, fused quartz flour, diatomaceous earth, and calcium carbonate; inorganic pigments such as cobalt aluminate; heat resistance improvers such as titanium oxide, iron oxide, cerium oxide, cerium hydroxide, zinc carbonate, magnesium carbonate, and manganese carbonate; heat conductive agents such as alumina, boron nitride, silicon carbide, and metal powder; electroconductive agents such as carbon black, silver powder, and electroconductive zinc white; and organic compounds as organic pigments, antioxidants or the like. Further, non-functional perfluoropolyethers may also be added as a plasticizer, viscosity regulator, flexibilizer or the like. These additives may be used in any desired amounts as long as they do not compromise the objects of the invention.

Preparation Method

The composition of the invention may be prepared by any desired method, for example, by intimately mixing components (a) to (f) and optional components on a mixing device such as a Ross mixer, planetary mixer, Hobart mixer or two-roll mill. The composition may also be prepared in two parts, which are combined together on use.

With respect to curing of the resulting composition, room temperature curing is possible depending on the type of functional group in component (a) and the type of catalyst, although the composition is generally cured by heating at a temperature of preferably at least 60° C., more preferably 100 to 200° C. for a time of several minutes to several hours.

The composition of the invention is effectively used in bonding to an organic resin, typically thermoplastic resin to form an integral molded article. The thermoplastic resins as the adherend include commonly used engineering plastics such as ABS resins, nylon, polycarbonate (PC), polyphenylene oxide, polybutylene terephthalate (PBT), polyphenylene sulfide, polyethylene terephthalate (PET), and polyethylene naphthalate (PEN), and other engineering plastics such as polyarylate, polysulfone, polyether sulfone, polyether imide, polyether ether ketone, polyimide, and liquid crystal polymers.

On use, the curable composition of the invention may be dissolved in suitable fluorochemical solvents (solvents containing fluorine in the molecule), such as m-xylene hexafluoride and alkyl perfluoroalkyl ethers to a desired concentration depending on the application or purpose intended.

Molded Article

The other aspect of the invention relates to a molded rubber article comprising an organic resin and a cured rubber product of the curable fluoropolyether composition, which article is prepared by integral molding of the organic resin and the fluoropolyether composition. An appropriate molding method may be selected in accordance with the shape of the desired molded article. Prior art known methods may be employed, for example, casting of the composition into a suitable mold followed by curing, coating of the composition on a suitable substrate followed by curing, and lamination. Among others, integral molding by injection molding is preferred for productivity or the like. In this case, a thermoplastic resin composition is primarily injected into the cavity of an injection mold, the curable fluoropolyether composition is secondarily injected over the pre-molded resin composition, and the fluoropolyether composition is cured at a temperature which is equal to or higher than the softening point and less than the melting point of the thermoplastic resin, whereby the fluoropolyether composition is bonded and integrated to the pre-molded thermoplastic resin. The mold temperature is not particularly limited as long as it is equal to or higher than the softening point of the thermoplastic resin composition. The mold temperature is usually below the melting point of the thermoplastic resin composition and preferably from 100° C. to 200° C., and more preferably from 100° C. to 150° C. If the temperature of the mold cavity is below the softening point of the thermoplastic resin composition, instant adhesion becomes insufficient to provide an integrally molded article. At temperatures below 100° C., curing of a composite molded part takes a longer time, resulting in a prolonged injection molding cycle. Temperatures above 200° C. can cause heat deflection to the thermoplastic resin, resulting in a molded part with a degraded dimensional accuracy.

The cured rubber product thus obtained is a rubber material having a hardness (JIS-A hardness) of 10 to 80 according to JIS K6253 and a glass transition temperature equal to or lower than −40° C.

The cured rubber product obtained by curing the perfluoropolyether rubber composition has excellent properties including heat resistance, chemical resistance, solvent resistance, water repellency, oil repellency, and weatherability, and especially low permeability to acidic gas so that it will find a variety of applications.

The molded rubber article, which is obtained by integral molding of an organic resin and the curable fluoropolyether composition or a cured rubber product thereof, can be used as members in automobiles, chemical plants, ink jet printers, semiconductor manufacturing lines, analytical and scientific instruments, medical equipment, aircraft, fuel cells and the like.

Specifically, the molded resin/rubber articles may be used in automobiles as diaphragms such as fuel regulator diaphragms, pulsation damper diaphragms, oil pressure switch diaphragms, and EGR diaphragms, valves such as canister valves and power control valves, O-rings such as quick connector O-rings and injector O-rings, seals such as oil seals and cylinder head gaskets, or the like; in chemical plants as pump diaphragms, valves, O-rings, packings, oil seals, gaskets or the like; in power plants as pump diaphragms, O-rings, packings, valves, gaskets or the like; in ink jet printers and semiconductor manufacturing lines as diaphragms, valves, O-rings, packings, gaskets or the like; in analytical and scientific instruments and medical equipment as pump diaphragms, O-rings, packings, valves, joints or the like; as fuel cell sealing materials, electrical moisture-proof coating materials, sensor potting materials, tent coating materials, molded parts, extruded parts, coats, copier roll materials, laminate rubber fabrics, seals or the like; and in aircraft as O-rings, face seals, packings, gaskets, diaphragms, valves or the like in fluid piping for engine oil, jet fuel, hydraulic oil, Skydrol® or the like.

EXAMPLE

Examples of the invention are given below by way of illustration and not by way of limitation. All parts are by weight. The kinematic viscosity is measured at 25° C. by an Ostwald viscometer. Me is methyl.

Example 1

A polymer of formula (15) having a kinematic viscosity of 5,600 mm²/S, 100 parts, was blended with 17 parts of silica Aerosil R976 (Aerosil Co., Ltd.). To the blend were added 0.2 part of a 50% toluene solution of ethynyl cyclohexanol, 0.3 part of a toluene solution of chloroplatinic acid-vinyl siloxane complex (platinum concentration 0.5 wt %), 3.5 parts of a compound of formula (16), 0.8 part of a compound of formula (17), and 0.15 part of a compound of formula (18). The ingredients were mixed to form a composition.

Next, an adhesion test assembly was prepared by using strips of each adherend material (100 mm×25 mm), lap joining the strips at overlapping end portions (10 mm) with a layer of the above composition (1 mm thick) intervening therebetween, and heating at 130° C. for 5 minutes for curing the composition. The assembly was subjected to a tensile shear adhesion test at a pulling rate of 50 mm/min for determining bond strength and cohesive failure. The results are shown in Table 1.

Example 2

A composition was prepared as in Example 1 except that 0.3 part of a compound of formula (19) was used instead of the compound of formula (18). The adhesion test was similarly carried out, with the results shown in Table 1.

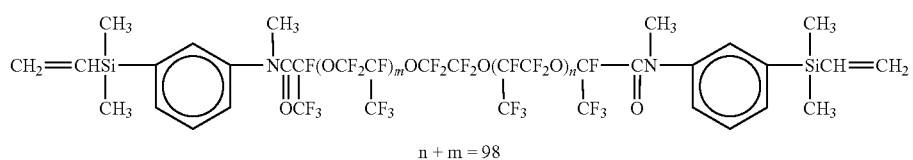

(15)

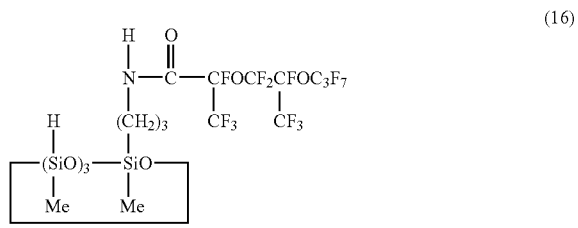

(16)

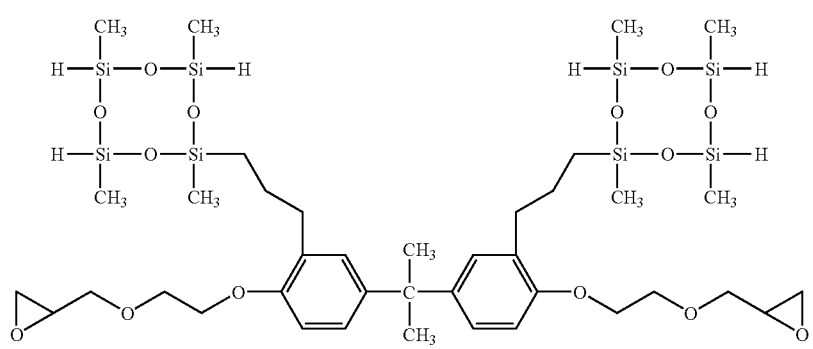

(17)

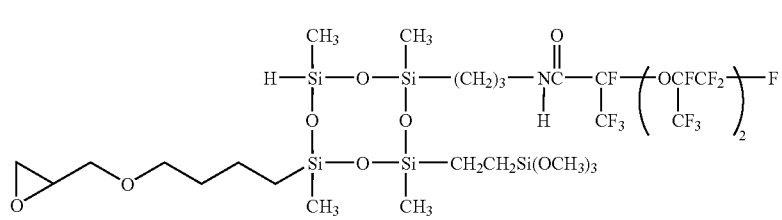

(18)

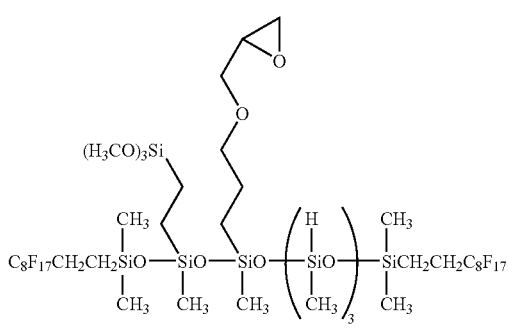

(19)

Example 3

A composition was prepared as in Example 1 except that 0.60 part of a compound of formula (20) was used instead of the compound of formula (17). The adhesion test was similarly carried out, with the results shown in Table 1.

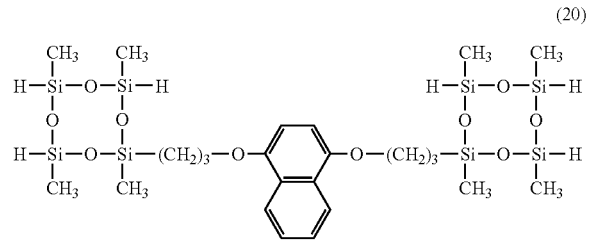

(20)

Comparative Example 1

A composition was prepared as in Example 1 except that 1.0 part of a compound of formula (21) was used instead of the compound of formula (18) and the compound of formula (19) was omitted. The adhesion test was similarly carried out, with the results shown in Table 1.

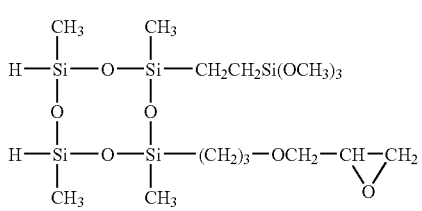

(21)

Comparative Example 2

A composition was prepared as in Example 1 except that 0.5 part of a compound of formula (22) was used instead of the compound of formula (18). The adhesion test was similarly carried out, with the results shown in Table 1.

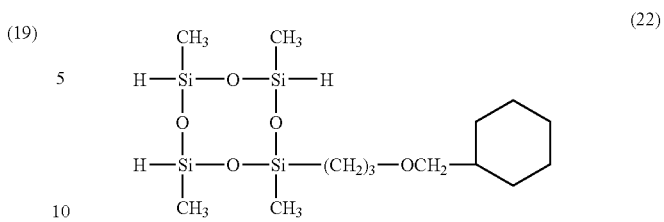

(22)

Durable Bond Test

An adhesion test assembly was prepared by using strips of each adherend material (100 mm×25 mm), lap joining the strips at overlapping end portions (10 mm) with a layer (1 mm thick) of each of the compositions in Examples 1-3 and Comparative Examples 1-2 intervening therebetween, and heating at 130° C. for 5 minutes for curing the composition. The assembly was immersed in hot water at 90° C. for 72 hours before it was subjected to a tensile shear adhesion test at a pulling rate of 50 mm/min for determining bond strength and cohesive failure. The results are shown in Table 2.

TABLE 1

| | | Shear bond strength, MPa (Cohesive failure, area %) | | | | |
|---|---|---|---|---|---|---|
| | | Example | | | Comparative Example | |
| | | 1 | 2 | 3 | 1 | 2 |
| Adherend | PET | 2.3 (100) | 1.9 (90) | 2.1 (100) | 0.4 (10) | 0.8 (40) |
| | PEN | 2.9 (100) | 2.6 (90) | 3.1 (100) | 0.2 (0) | 0.5 (0) |
| | PBT | 1.9 (80) | 1.4 (80) | 1.6 (80) | 0.8 (30) | 1.3 (60) |
| | PC | 3.0 (100) | 2.8 (100) | 2.8 (100) | 0.4 (30) | 0.9 (50) |
| | PI | 2.1 (90) | 1.8 (80) | 2.0 (90) | 0.6 (40) | 1.2 (60) |
| | Cr | 0 (0) | 0.2 (0) | 0 (0) | 0.8 (50) | 1.7 (80) |
| | Ni | 0 (0) | 0.2 (0) | 0 (0) | 1.1 (60) | 1.6 (70) |

TABLE 2

| | | Shear bond strength, MPa (Cohesive failure, area %) after hot water immersion | | | | |
|---|---|---|---|---|---|---|
| | | Example | | | Comparative Example | |
| | | 1 | 2 | 3 | 1 | 2 |
| Adherend | PET | 2.0 (90) | 1.4 (80) | 1.7 (100) | 0.1 (0) | 0.2 (0) |
| | PEN | 2.4 (100) | 2.2 (70) | 2.4 (90) | ≦0.1 (0) | 0.1 (0) |
| | PBT | 1.5 (70) | 1.0 (70) | 1.2 (60) | 0.1 (0) | 0.1 (0) |
| | PC | 2.8 (90) | 2.5 (80) | 2.0 (80) | 0.1 (0) | 0.3 (0) |
| | PI | 1.7 (80) | 1.3 (70) | 1.6 (70) | ≦0.1 (0) | 0.1 (0) |

PET: polyethylene terephthalate resin,
 Lumirror S10 by Toray Industries, Inc.
PEN: polyethylene naphthalate resin,
 Teonex Q51 by Teijin Dupont Films Japan, Ltd.
PBT: polybutylene terephthalate resin,
 Duranex 3300 by Polyplastics Co., Ltd.
PC: polycarbonate resin,
 Iupilon H-4000 by Mitsubishi Engineering Plastics Corp.
PI: polyimide resin,
 Aurum PL-450C by Mitsui Chemicals Co., Ltd.
Cr: chromium-plated steel strip
Ni: nickel-plated steel strip
 Japanese Patent Application No. 2007-134182 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A curable fluoropolyether composition, comprising
   (a) 100 parts by weight of a polyfluorodialkenyl compound having alkenyl groups at both ends of the molecular chain, represented by the formula (14), $$CH_2=CH-(Z)_a-Rf-(Z')_a-CH=CH_2 \qquad (14)$$

wherein Rf is a divalent group of the formula (i):

$$-C_tF_{2t}[OCF_2CF(CF_3)]_pOCF_2(CF_2)_rCF_2O[CF(CF_3)CF_2O]_qC_tF_{2t}- \qquad (i)$$

wherein p and q each are an integer of 1 to 150,
   the sum of p+q is on average 2 to 200,
   r is an integer of 0 to 6, and
   t is 2 or 3; or
   Rf is a divalent group of the formula (ii):

$$-C_tF_{2t}[OCF_2CF(CF_3)]_u(OCF_2)_vOC_tF_{2t}- \qquad (ii)$$

wherein u is an integer of 1 to 200,
   v is an integer of 1 to 50, and t is 2 or 3,
   Z is a divalent group of the formula: —CH$_2$—, —CH$_2$O—, —CH$_2$OCH$_2$— or —Y—NR—CO—, wherein Y is a divalent group of the formula: —CH$_2$— or the following formula:

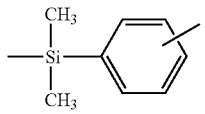

R is hydrogen or a substituted or unsubstituted monovalent hydrocarbon group,
   Z' is a divalent group of the formula: —CH$_2$—, —OCH$_2$—, —CH$_2$OCH$_2$— or —CO—NR—Y'—, wherein Y' is a divalent group of the formula: —CH$_2$— or the following formula:

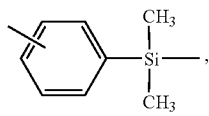

R is hydrogen or a substituted or unsubstituted monovalent hydrocarbon group, and
   a is independently 0 or 1,
   (b) a fluorinated organohydrogenpolysiloxane having at least two silicon-bonded hydrogen atoms (SiH groups) per molecule in a sufficient amount to provide 0.5 to 5.0 moles of SiH groups per mole of alkenyl groups available from component (a),
   (c) a platinum group metal catalyst in an amount to provide 0.1 to 500 ppm of platinum group metal based on the total weight of components (a) and (b),
   (d) 5 to 50 parts by weight of hydrophobic silica powder,
   (e) 0.01 to 15 parts by weight of a tackifier in the form of at least one silicon compound selected from the general formulae (I), (II), and (III):

$$A\text{-}(D\text{-}B)_x\text{-}D\text{-}A \qquad (I)$$
   $$C-(B\text{-}D)_x\text{-}B-C \qquad (II)$$
   $$A\text{-}E \qquad (III)$$

wherein
   A and B each are a silane or siloxane linkage having at least one silicon-bonded hydrogen atom and, optionally a silicon-bonded substituent group, said substituent group, if present, is an unsubstituted hydrocarbon group of 1 to 20 carbon atoms,
   A is a monovalent linkage,
   B is a divalent linkage,
   C and E are at least one monovalent group selected from the group consisting of the following formulae: (2), (4), (6), (7) and (8), and optionally another group, said another group, if present, being an alkyl,
   D is a divalent linkage comprising at least one group of the following formulae: (1), (3), (5), (9), (10), (11), (12) and (13), and optionally another group, said another group, if present, being an alkylene group,
   with the proviso that E is a monovalent linkage in which the total number of atoms other than hydrogen and halogen atoms is at least 8,
   x is 0 or a positive number,

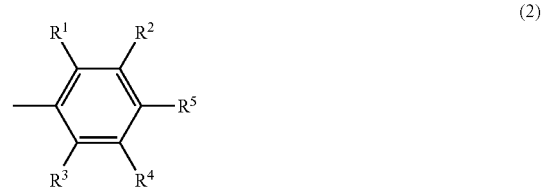

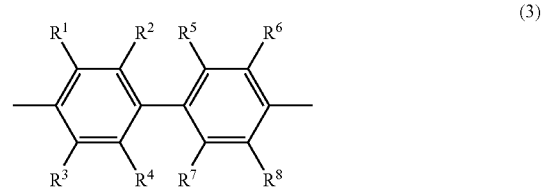

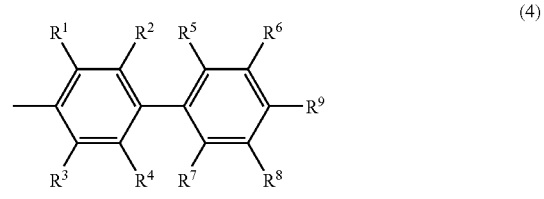

(5)
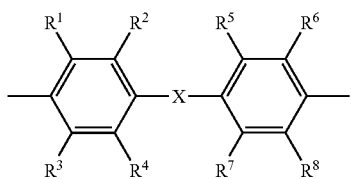

(6)
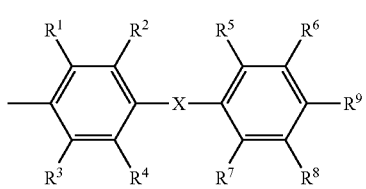

(7)
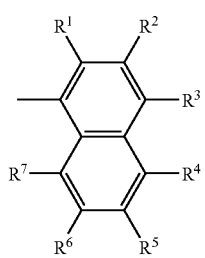

(8)
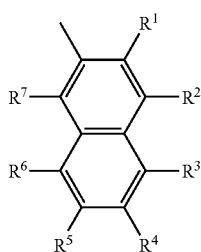

(9)
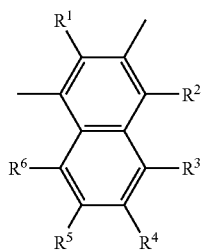

(10)
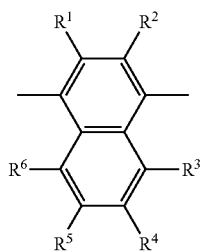

(11)
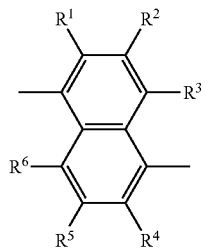

(12)
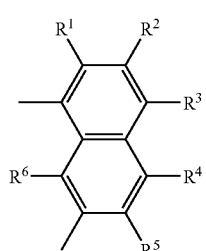

(13)
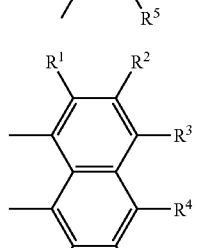

$R^1$ to $R^9$ are each independently a monovalent group selected from the group consisting of hydrogen, halogen, hydroxyl, an unsubstituted monovalent hydrocarbon group having 1 to 20 carbon atoms, and a monovalent organic group having an alkoxy, epoxy and/or trialkoxysilyl group, X is a divalent group selected from the group consisting of:

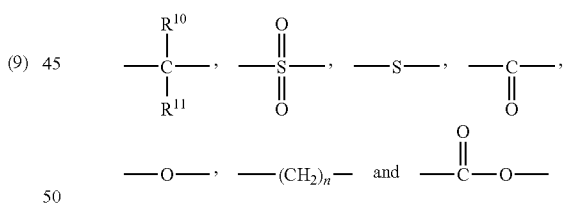

$R^{10}$ and $R^{11}$ are each independently selected from the group consisting of hydrogen, halogen, an unsubstituted monovalent hydrocarbon having 1 to 20 carbon atoms, and a monovalent organic group of 1 to 20 carbon atoms having a perfluoroalkyl or perfluoropolyether group, or $R^{10}$ and $R^{11}$, taken together, may form a carbocyclic or heterocyclic ring with the carbon atom to which they are attached, n is an integer of at least 2, and (f) 0.01 to 10 parts by weight of an organosiloxane having per molecule at least one silicon-bonded hydrogen atom, at least one epoxy and/or trialkoxysilyl group attached to a silicon atom via carbon atoms or via carbon and oxygen atoms, and at least one perfluoroalkyl or perfluoropolyether group of 1 to 20 carbon atoms attached to a silicon atom via a divalent organic group.

2. The composition of claim 1, wherein the fluorinated organohydrogenpolysiloxane (b) has at least one perfluoroxyalkyl, perfluoroalkyl, perfluoroxyalkylene or perfluoroalkylene group per molecule.

3. The composition of claim 1, wherein the tackifier (e) exhibits a contact angle of up to 70° on an organic resin as an adherend.

4. A molded rubber article obtained by integral molding of an organic resin and a cured rubber product of the curable fluoropolyether composition of claim 1.

5. An integral molded resin/rubber article comprising the molded rubber article of claim 4, that is selected from the group consisting of a fuel regulator diaphragm, a pulsation damper diaphragm, an oil pressure switch diaphragm, an EGR diaphragm, a canister valve, a power control valve, a quick connector O ring, an injector O-ring, an oil seal and a cylinder head gasket.

6. An integral molded resin/rubber article comprising the molded rubber article of claim 4, that is selected from the group consisting of a diaphragm, a valve, an O-ring, a packing, a seal, and a gasket.

7. An jet printer or a semiconductor manufacturing line comprising the integral molded resin/rubber article of claim 6.

8. An analytical instrument, a scientific instrument or a piece of medical equipment comprising the integral molded resin/rubber article of claim 6.

9. A tent coating material, a molded part, an extruded part, a coat, a copier roll material, an electrical moisture-proof coating, a laminate rubber fabric, a fuel cell gasket or a fuel cell seal which coats or comprises the integral molded resin/rubber article of claim 4.

10. An aircraft comprising fluid piping comprising the integral molded resin/rubber article of claim 7.

11. The integral molded resin/rubber article of claim 6, that is a diaphragm.

12. The integral molded resin/rubber article of claim 6, that is a valve.

13. The integral molded resin/rubber article of claim 6, that is an O-ring.

14. The integral molded resin/rubber article of claim 6, that is a packing.

15. The integral molded resin/rubber article of claim 6, that is a seal.

16. The integral molded resin/rubber article of claim 6, that is gasket.

17. An ink jet printer comprising the integral molded resin/rubber article of claim 6.

18. A semiconductor manufacturing line comprising the integral molded resin/rubber article of claim 6.

19. A scientific instrument comprising the integral molded resin/rubber article of claim 6.

* * * * *